United States Patent
Showers

(10) Patent No.: US 8,844,218 B2
(45) Date of Patent: Sep. 30, 2014

(54) AEROGEL WINDOW FILM SYSTEM

(71) Applicant: Robert James Showers, Naugatuck, CT (US)

(72) Inventor: Robert James Showers, Naugatuck, CT (US)

(*) Notice: Subject to any disclaimer, the term of this patent is extended or adjusted under 35 U.S.C. 154(b) by 0 days.

(21) Appl. No.: 14/073,333

(22) Filed: Nov. 6, 2013

(65) Prior Publication Data

US 2014/0065329 A1  Mar. 6, 2014

Related U.S. Application Data

(63) Continuation of application No. PCT/US2012/036650, filed on May 4, 2012.

(60) Provisional application No. 61/483,510, filed on May 6, 2011, provisional application No. 61/487,523, filed on May 18, 2011, provisional application No. 61/488,897, filed on May 23, 2011, provisional application No. 61/491,733, filed on May 31, 2011, provisional application No. 61/511,837, filed on Jul. 26, 2011, provisional application No. 61/512,996, filed on Jul. 29, 2011.

(51) Int. Cl.
*E06B 3/66* (2006.01)
*E06B 3/67* (2006.01)
*B32B 5/00* (2006.01)

(52) U.S. Cl.
CPC ............ *E06B 3/6612* (2013.01); *E06B 3/6715* (2013.01); *B32B 5/00* (2013.01); *Y02B 80/26* (2013.01)

USPC ............. 52/204.597; 52/786.11; 52/786.13; 52/204.7; 428/34

(58) Field of Classification Search
CPC . E06B 3/6715; E06B 3/6612; E06B 3/66304; E06B 3/677; E06B 5/00; B32B 17/00; Y02B 80/24
USPC .......... 52/200–201, 204.597, 204.593, 204.6, 52/204.7, 783.1, 783.11, 783.13, 787.11, 52/786.1; 428/34, 213
See application file for complete search history.

(56) References Cited

U.S. PATENT DOCUMENTS

| | | | |
|---|---|---|---|
| 4,950,344 A | 8/1990 | Glover et al. | |
| 5,118,543 A * | 6/1992 | McColl | 428/34 |
| 5,128,181 A * | 7/1992 | Kunert | 428/34 |
| 5,514,428 A * | 5/1996 | Kunert | 428/34 |
| 6,821,175 B1 * | 11/2004 | Tuck et al. | 445/24 |
| 7,732,496 B1 | 6/2010 | Leventis et al. | |
| 7,954,283 B1 * | 6/2011 | Tinianov | 52/204.593 |
| 8,377,524 B2 * | 2/2013 | Theios et al. | 428/34 |
| 2012/0225239 A1 * | 9/2012 | Showers | 428/72 |

FOREIGN PATENT DOCUMENTS

RU  50578 U1  1/2006

* cited by examiner

*Primary Examiner* — Jeanette E Chapman

(57) ABSTRACT

An insulated glazing unit with a nanotechnology enhanced film for improved IGU insulating capability. The present invention makes use of a layered film or sheet system to further provide a double or triple pane window glazing unit sound, vibration, and thermal insulation with the option of allowing users to still view through the unit clearly.

23 Claims, 16 Drawing Sheets

AEROGEL WINDOW FILM SYSTEM

The current application claims a priority of the PCT application PCT/US2012/036650 filed on May 4, 2012 which claimed a priority of the Provisional Patent Application No. 61/483,510 filed on May 6, 2011, the Provisional Patent Application No. 61/487,523 filed on May 18, 2011, the Provisional Patent Application No. 61/488,897 filed on May 23, 2011, the Provisional Patent Application No. 61/491,733 filed on May 31, 2011, the Provisional Patent Application No. 61/511,837 filed on Jul. 26, 2011, and the Provisional Patent Application No. 61/512,996 filed on Jul. 29, 2011.

FIELD OF THE INVENTION

The present invention relates generally to an insulated glass unit (IGU). The present invention uses two glass panes to trap gas or air as an insulator. The IGU incorporates a unique film system that further increases the insulating properties.

BRIEF DESCRIPTION OF THE PRIOR ART

The U.S. Pat. No. 4,831,799 introduces a multi-layered insulated glazing unit that can be filled with insulating gasses. The IGU has two panes of glass. Each glass pane has two side surfaces. The two panes have four glass surfaces. Glass is typically known as an extremely poor insulator due to it being energy conductive. Although many IGU glazing surfaces are coated with thin layers of metal or metal oxide high performance coatings that emit little radiation in the long-wave spectrum (infrared) for diminishing heat loss from a building's interior and reducing heat gain in hot weather, the glazing of glass still is not highly effective against heat transferred by means of conduction. The trapped gas in the IGU cavity directly contacts the poorly insulating glass. Outside the IGU cavity, the poorly insulating glass surfaces are also in direct contact with air and heat or cold. Therefore, the sealed unit, especially the glass, is very poorly insulated. Heat is very easily transferred through the unit compared to well insulated walls and well insulated ceilings.

The U.S. Pat. No. 5,421,939 introduces a method of fabricating a solar window film with a design to a glass window. This invention does not make use or Aerogels or X-aerogels and is not utilized in association with an IGU for the purpose of significantly restricting heat transfer caused by conduction. This invention is a conductor of heat by means of conduction and is a very poor insulator after sundown, especially in the wintertime during both daytime and nighttime.

The United States Patent Application 20100266801 introduces a window film that includes a flexible polymeric substrate to provide low emissivity properties. This invention does not make use or Aerogels or X-aerogels and is not utilized in association with an IGU for the purpose of significantly restricting heat transfer caused by conduction. This invention is a conductor of heat by means of conduction and a very poor insulator after sundown, especially in the wintertime during both daytime and nighttime.

The United States Patent Application 20090092806 introduces a solar control window film that comprises an image layer that is sandwiched between a substrate and an adhesive layer. This invention does not make use or Aerogels or X-aerogels and is not utilized in association with an IGU for the purpose of significantly restricting heat transfer caused by conduction. This invention is a conductor of heat by means of conduction and a very poor insulator after sundown, especially in the wintertime during both daytime and nighttime.

Although fragile aerogel is currently widely accepted as the most effective commercially available solid with ultra low thermal conductivity, the U.S. Pat. No. 7,732,496 introduces polymer cross-linked aerogels (X-Aerogels) for commercial insulation applications that are far stronger. X-aerogels as a technology includes aerogels that are extremely lightweight glass foams having pores ranging from 10 to 50 nanometers. When serving as a super-insulator, it does not require a high vacuum to maintain low thermal conductivity. Traditional aerogel is very fragile and lacks durability and flexibility when exposed to the environment and bending. X-aerogels as a technology significantly improves upon the durability and mechanical properties of aerogels while maintaining desirable insulating properties that aerogel is very well known for. X-aerogels as a technology involves cross-linking, conformable coating, and engineered polymers resulting in increased strength. Traditional aerogel is quite fragile and very easily broken whereby a cross-linked aerogel is capable of being flexible while exhibiting rubber like characteristics and through National Aeronautics and Space Administration's (NASA) technology in association with their associate's technology is now available as a strong, flexible, highly insulating, optically transparent or translucent film or sheet.

BACKGROUND OF THE INVENTION

Insulated Glass Units (IGU) are commonly manufactured having two or three panes of glass set apart at all side edges using various types of IGU spacers that are factory sealed together to form a single insulated double or triple glass unit. One effective IGU spacer is known as a warm edge structural foam spacer. Manufacturers such as Edgetech and Glasslam USA (also known as Nebula Glass) commercially offer structural silicone foam IGU spacers. Triple glass units are also manufactured although industry wide is considered to be very heavy and require much heavier costlier framing. Glass in an IGU is often used to provide light while allowing a view through area from one side of the IGU to the other side. IGU are often manufactured having glass in a thickness range from as much as 10 mm and as little as 3 mm or even slightly more or less in very special applications. Although many IGU glazing surfaces are coated with thin layers of metal or metal oxide high performance coatings that emit little radiation in the long-wave spectrum (infrared) for diminishing heat loss from a building's interior and reducing heat gain in hot weather, the glazing of glass still is not highly effective against heat transferred by means of conduction. Tempered and laminated glass is also used at times for manufacturing IGU. A majority of these insulated glass units are manufactured with the same thickness of glass used on all panes although in special applications such as security or more acoustic applications certain specialty manufactures do include at times a wider range of thicknesses incorporated within the same IGU. Many various combinations and thicknesses are manufactured at times, although manufacturers limit the term of their warranty or provide no warranty at all based on their assessment of risk. Depending on overall dimensions to include width and height, glass pane thickness as well as the type of glazing for each pane as well as the overall unit thickness is specified by manufacturers based on their assessment of risk and past performance history. During IGU assembly, IGU spacers of specific thicknesses are cut to exact size and assembled into the required height, thickness, and width dimensions. An IGU adhesive serving as a sealant is applied to the face of the spacer on each of its sides and the panes of glazing are pressed against the spacer for sealing the unit. When an IGU cavity is filled with gas, two holes are drilled through the spacer once the unit is sealed. The trapped air is drawn out of the IGU cavity and then replaced with an IGU insulating gas. Next, the holes are sealed containing the gas inside the IGU cavity. The result is trapped insulating gas between panes of very poorly insulating glass, especially in regard to conduction through the solid glass. It is the objective of the present invention to reduce heat transfer passing through the glass pane surfaces and IGU as a whole. The invention is a super-insulating gas filled IGU that incorporates a unique film system that includes X-aerogels formed as films along with high performance transparent films and transparent UV stable bonding adhesives. NASA Glenn Research center researchers and their associates have developed a new class of strong lightweight materials known as X-aerogels. The chemistry in these new materials shall be formulated with custom tailored polymers that produce optically transparent or translucent properties that still possess highly beneficial insulating properties that traditional Aerogel is so well known for. According to NASA publication, the production of X-aerogels as films and sheets have already been manufactured although on a very small scale and, currently, Parker Hannifin together with NASA Glenn Research center, OAI, University of Akron, Ohio, and other associates are developing a process for manufacturing X-aerogels conformed to sheets and films for a variety of industrial products. Furthermore, plans for the purpose of ramping up continuous manufacturing processes have already been initiated as well. Glass surfaces on the glass panes, making up a traditional IGU, are traditionally viewed through. Unlike a traditional IGU, the invention is fully or partially covered with the Nano-technology X-aerogel super-insulating film or sheet system that, although is optically transparent or translucent has not yet been developed or manufactured to be as clear as the clearest glass panes such as are commonly used for IGU. The gap between the glass panes making up the IGU cavity traps air or argon gas (or other suitable gas). Glass is well known in the IGU industry as an extremely poor insulator compared to well insulated walls and well insulated ceilings especially in regard to conduction and the panes of glass directly in contact with trapped air or gas inside a traditional IGU cavity enabling unwanted heat transfer. Furthermore, air on the outside of a traditional IGU cavity is also in direct contact with the exterior glazing panes of glass and again unwanted heat is again transferred even further, especially in regard to conduction. IGU manufacturers for many decades have acknowledged the poor insulating properties of traditional glass glazing, and this is fully understood by those well practiced in the art of IGU manufacturing. Traditional IGU have a minimal ability to insulate due to the nature of glass and due to its very poor ability to slow down heat transfer, especially through conduction. Although X-aerogels can be formulated with custom tailored polymers to be either optically transparent or translucent, not all X-aerogels allow light through them while still maintaining superior insulating and sound proofing properties. In addition to their superior ability to insulate heat, these optically transparent and translucent insulating X-aerogels are also a superior vibration dampening and sound proofing materials. With the application to window glazing, buildings are provided with a sound barrier between the interior and exterior for reduction of noise pollution such as city traffic. The superior mechanical strength of X-aerogels also provide for better security when applied to window glazing. The strength of an X-aerogel makes it far more difficult to break window glazing with the film system applied.

According to LLumar (http://www.llumar.com/en/CommercialSolarControl.aspx), the U.S. Department of Energy estimate that one-third of a building's cooling load is from solar gain through windows and that nearly 75% of all existing windows are not energy efficient. According to the ObservatoryNANO briefing #3 of August 2010 (http://www.observatorynano.eu/project/filesystem/files/ObservatoryNANO%20Briefing%20No.3%20Nano-Enabled%20Insulation%20Materials.pdf), the largest energy consumer (40%) and the main contributor to greenhouse gas ($CO_2$) emissions is the construction sector. Around 80% of construction-related energy consumption and greenhouse gas (GHG) emissions is linked to the energy use within the building over its lifetime, whereas only 20% is linked to energy used to produce and transport the materials used in the building. Heating, ventilation, and air conditioning (HVAC) accounts for 36% of a building's energy consumption. Resultantly, HVAC represents a significant portion of energy consumption and greenhouse gas emissions. However, buildings are generally long-lasting, with average lifetimes of greater than 50 years. With long lasting buildings, the attempt to make a drastic improvement for energy efficiency performance in buildings are through the application of superior insulation and thermal management technologies into new buildings. To have a larger impact in a shorter time period, existing buildings must be fitted and installed with the superior insulation and thermal management technologies.

At the time of the present invention, according to NASA and their associate's publications and the NASA website X-aerogels were recognized for very specific applications including: cryogenic propellant tank insulation, insulation for hoses, catalytic applications, optically transparent or translucent X-aerogels in the form of pellets for filling skylights (although were not intended to be viewed through), insulating shipping containers, battery membrane applications, dielectrics electronic applications, impact absorbing applications, fuel cell applications, unspecified laminates to especially include those that are not optically translucent or translucent, membranes for filtration applications, optical sensor applications, and specifically identified aerospace applications. NASA and associates have only specifically published the usefulness of completely filling an entire cavity of an IGU with X-aerogels in the form of totally separated pellets. Although the separate pellets are superior in insulation, air between each pellet is an undesirable source of heat transfer. Heat energy is transferred by the circulation of the air between pellets that directly come into contact with poorly insulating glass. In reference to the document LEW-17685-1 published on Feb. 28, 2011 by the Glenn Research Technology Center, one such application is in collaboration with Iten Industries of Ashtabula, Ohio. This was published as only for a total IGU cavity fill application that was specifically related to a GATE partnership agreement with Iten Industries. At the time of the present invention, published NASA and associates applications did not specify optically transparent and translucent X-aerogels formed as films or sheets and high performance films as systems utilized in association with a gas filled IGI with versatile uses with clear areas having no X-aerogels as a option as described in the present invention. The present invention utilizes only suitable X-aerogels that are optically transparent and translucent, mechanically strong as films and sheets for damping vibration, adding privacy, to reduce breakability, decorative appeal, for super-insulating and as sound proofing for insulated glass units (IGUs). The present invention utilizes the suitable X-aerogels in a new, novel, and useful way as components for (IGUs) to include versatile applications such as seen in FIG. 3-7. The problem with traditional gas filled IGU, having glazing surfaces directly exposed to gas trapped inside an IGU cavity as well as glazing of poorly insulating glass directly exposed to air outside of the IGU cavity enabling unwanted heat transfer, especially in regard to conduction through solid glass, has not been successfully addressed up until the present invention.

New wall constructions are required by certain building codes to be up to R-21 value and ceilings are required to be up to R-48. Double pane windows currently on the market, on average, are only on average R-value of 3. Traditional windows have up to 7 times less R-value than some walls are required by code to have. Traditional windows are up to 15 times less insulating than some ceilings are expected by code to be. R-Value is a measure of thermal resistance used in building and construction. The present invention will be an super-insulating glazing unit that will be highly insulating while adding value though additional insulation value, soundproofing, privacy, design, protection against breakage over traditional windows offered on the international market while offering optional configurations with designated areas having no X-aerogel layers that can be as clearly viewed through as an IGU having clear glazing made of glass.

Of significant importance is that at night or when solar heat is not present, existing window films have an insignificant ability to insulate glazing, especially in regard to conduction unlike the present invention. Unlike brand name aftermarket window films, the present invention is a super insulating IGU having highly versatile films in the form of systems that are highly effective in hot, cooler, and extremely cold seasons, especially t during the wintertime. At night, during a period of darkness during the time from sunset to sunrise, or when solar heat is not present in both warm and cold weather, the present invention has a significant ability to insulate glazing surfaces, especially in regard to heat transferred by conduction.

The current nanotechnology super-insulating IGU invention does not add any significant weight, such as a triple pane glass unit does, which is highly desirable as weight remains a primary concern for window glazing due to costly framing that must be added as weight is added. The problem of not having a light weight super insulating glazing unit, as featured in the present invention, has not been effectively addressed and remains a problem internationally.

BRIEF DESCRIPTION OF THE DRAWINGS

FIG. 4 is an exploded view of another embodiment of the present invention, where the plurality of insulating sheets has shaped holes completely traversing through. The holes provide users with an optically clear (clear glass only) area of the IGU to view through.

DETAIL DESCRIPTIONS OF THE INVENTION

Figure 1:
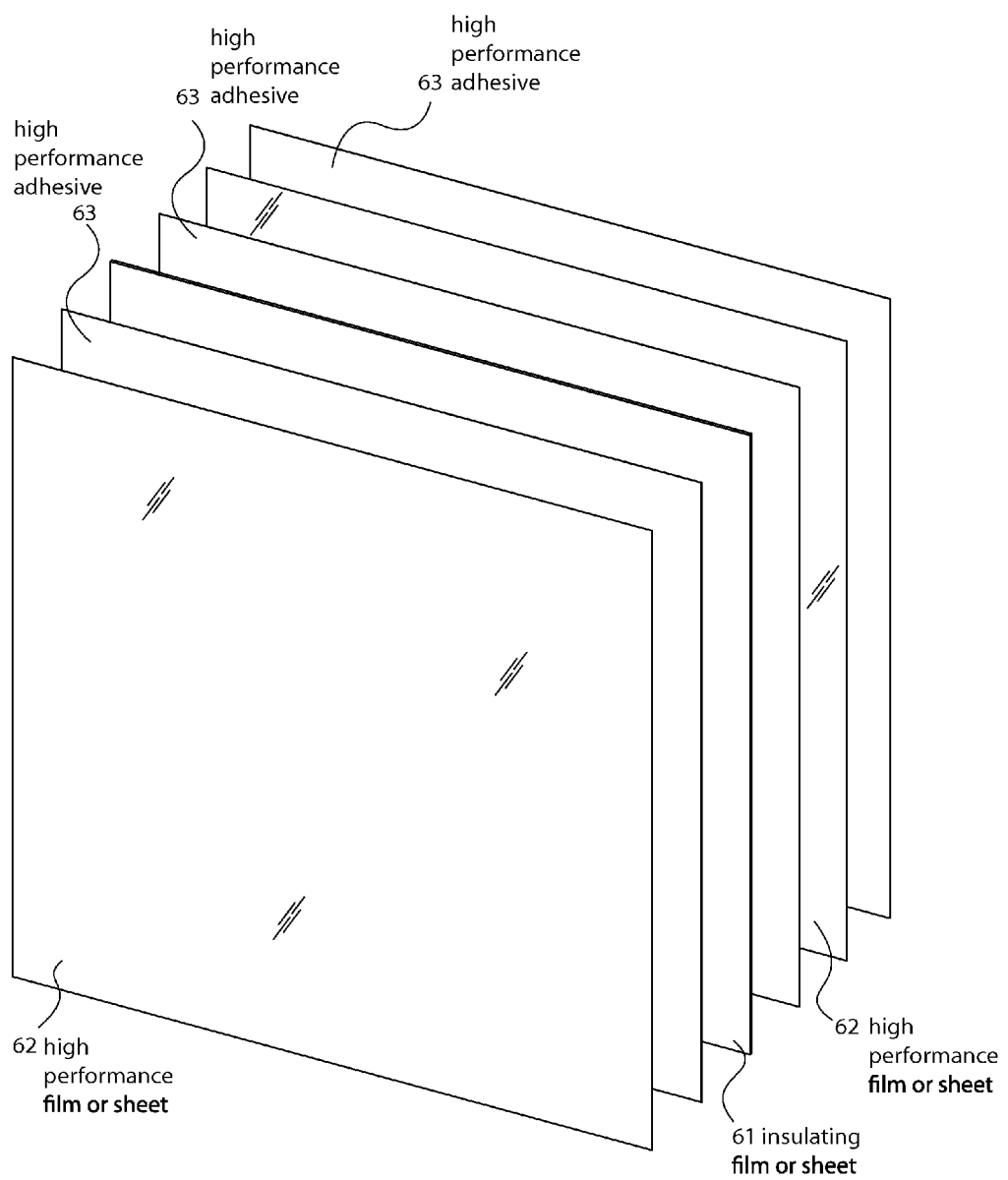
FIG. 1 is an exploded view of an embodiment of the insulating sheet with six layers.

All illustrations of the drawings are for the purpose of describing selected versions of the present invention and are not intended to limit the scope of the present invention. This present invention has already been described by the inventor in laymen's terms in the previously filed provisional applications as follows; U.S. Provisional Patent application Ser. No. 61/483,510 filed on May 6, 2011, the U.S. Provisional Patent application Ser. No. 61/484,600 filed on May 10, 2011, the U.S. Provisional Patent application Ser. No. 61/487,523 filed on May 18, 2011, the U.S. Provisional Patent application Ser. No. 61/488,897 filed on May 23, 2011, the U.S. Provisional Patent application Ser. No. 61/491,733 filed on May 31, 2011, and the U.S. Provisional Patent application Ser. No. 61/510, 114 filed on Jul. 21, 2011. This purpose of this present application is to also describe the present invention in patent engineer's terms in addition to said previously filed laymen's terms. Although suitable materials are specified for the invention all other suitable gel technologies, adhesives, and film materials, to include emerging and improved upon technologies also to include those that may be made commercially available in the future, may also be used. Extending X-aerogels as a technology by further improving desirable properties, optimizing faster lower costing processes, using superior cross linkers and alternatives to high cost silica aerogels are already underway. As suitable improvements become commercially available and advantageous, they may also be utilized in the present invention. Future combinations of cross linkers and surface functional groups for further improving desirable properties of X-aerogels when suitable can also be utilized for the present invention as they become commercially available.

At the time of the present invention and filing of a previous patent application, well before NASA Publication dated Jul. 28, 2011 announcing polymer-based more flexible films (non-silica alternatives), the inventor of the present invention specified suitable alternatives to Silica Aerogels formed as super-insulating, improved upon strong, durable, transparent, and translucent flexible films. This was clearly specified as improved upon emerging gel technologies that were already well underway and that will later be made commercially available in the future. Therefore, the emerging and improved upon suitable silica alternative, non-silica NASA announced Jul. 28, 2011 polymer-based Aerogels were already well underway and therefore specified for in the present invention. Said non-silica polymer-based aeogels as suitable films as alternatives to silica in previous specified X-aerogels that were already well underway, have therefore already been fully addressed for use in the present invention and therefore are claimed as a preferred embodiment for use as the suitable transparent or translucent super-insulating, strong more flexible polymer-based Aerogel insulating films or sheets.

The present invention is an insulated glazing unit (IGU) with nanotechnology enhanced insulation. The present invention is an IGU that comprises a first pane 1, a second pane 2, a spacer 3, a barrier sealant 4, a spacer seal 5, an insulating gas, and a plurality of insulating sheets 6. The first pane 1 and the second pane 2 are combined together to form the main body of the IGU. In reference to FIG. 3-5, the first pane 1 is aligned and connected to the second pane 2 by means of the spacer 3. The first pane 1 has a first inner surface and a first outer surface. The second pane 2 has a second inner surface and a second outer surface. The spacer 3 is peripherally adhered to the first inner surface of the first pane 1 by the spacer seal 5. In the preferred embodiment of the present invention, the spacer seal 5 is an acrylic seal. The second pane 2 is aligned and adhered to the spacer 3 opposite of the first pane 1. The spacer 3 is peripherally adhered to the second inner surface of the second pane 2 by the spacer seal 5. The first pane 1, the second pane 2, and the spacer 3 together define a sealed space. In the preferred embodiment of the present invention, the spacer 3 is made from the material structural foam. However, in all other embodiments of the present invention, the spacer 3 can be made from other suitable thermally resistant material to include suitable emerging X-aerogels as well as other suitable gel insulating materials made commercially available in the future.

Figure 3:
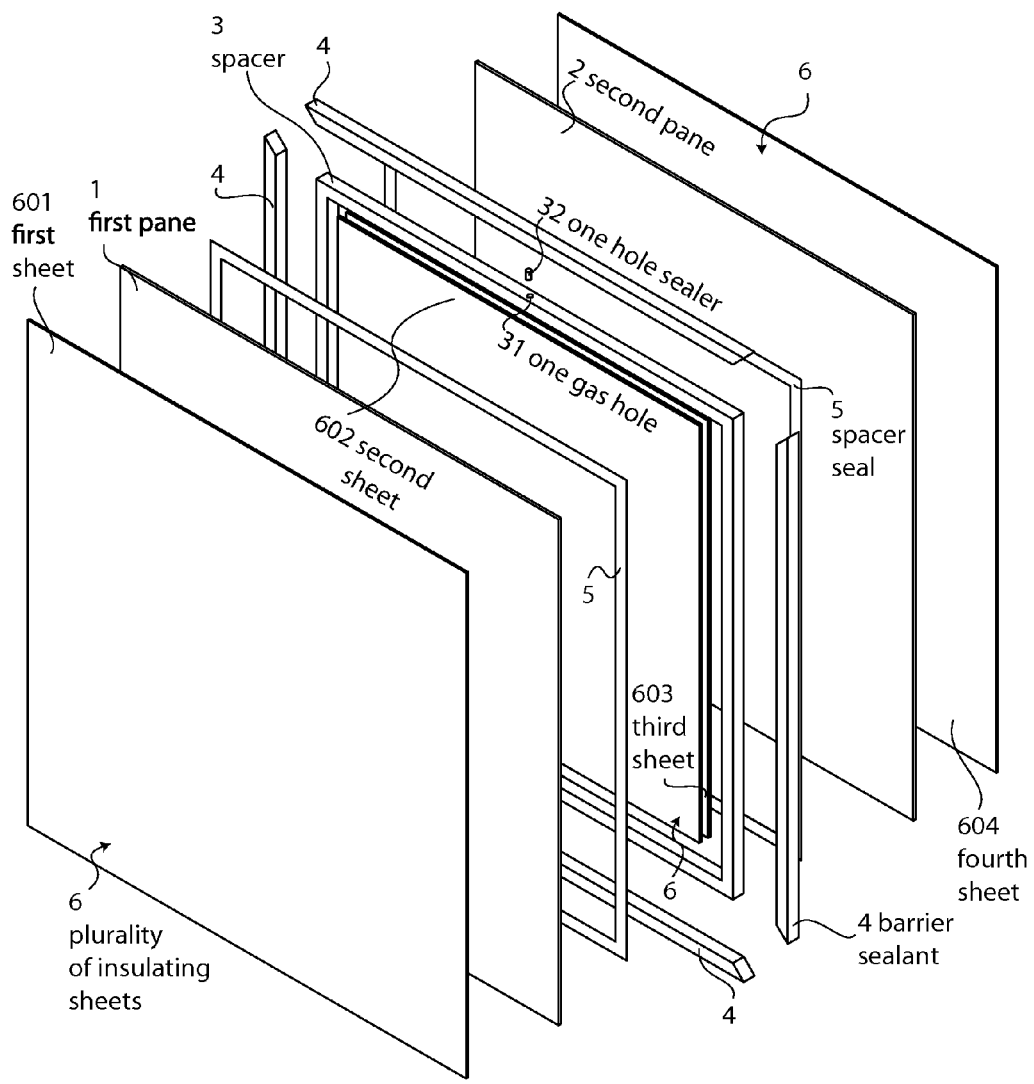
FIG. 3 is an exploded view of the present invention using the plurality of insulating sheets to fully cover the first outer surface and the second outer surface. The first inner surface and the second inner surface are also covered by the plurality of insulating sheets in the area defined by the spacer.
Figure 4:
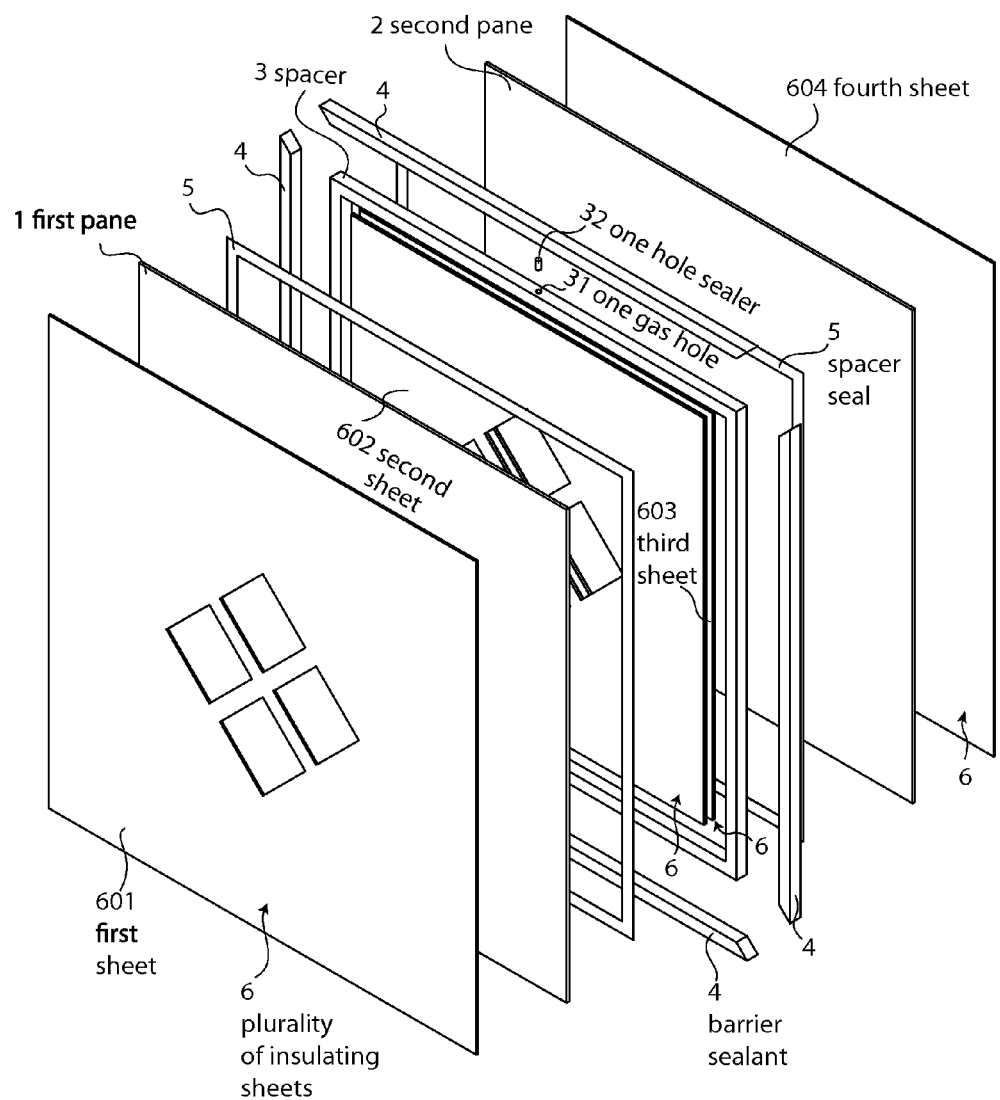
Figure 5:
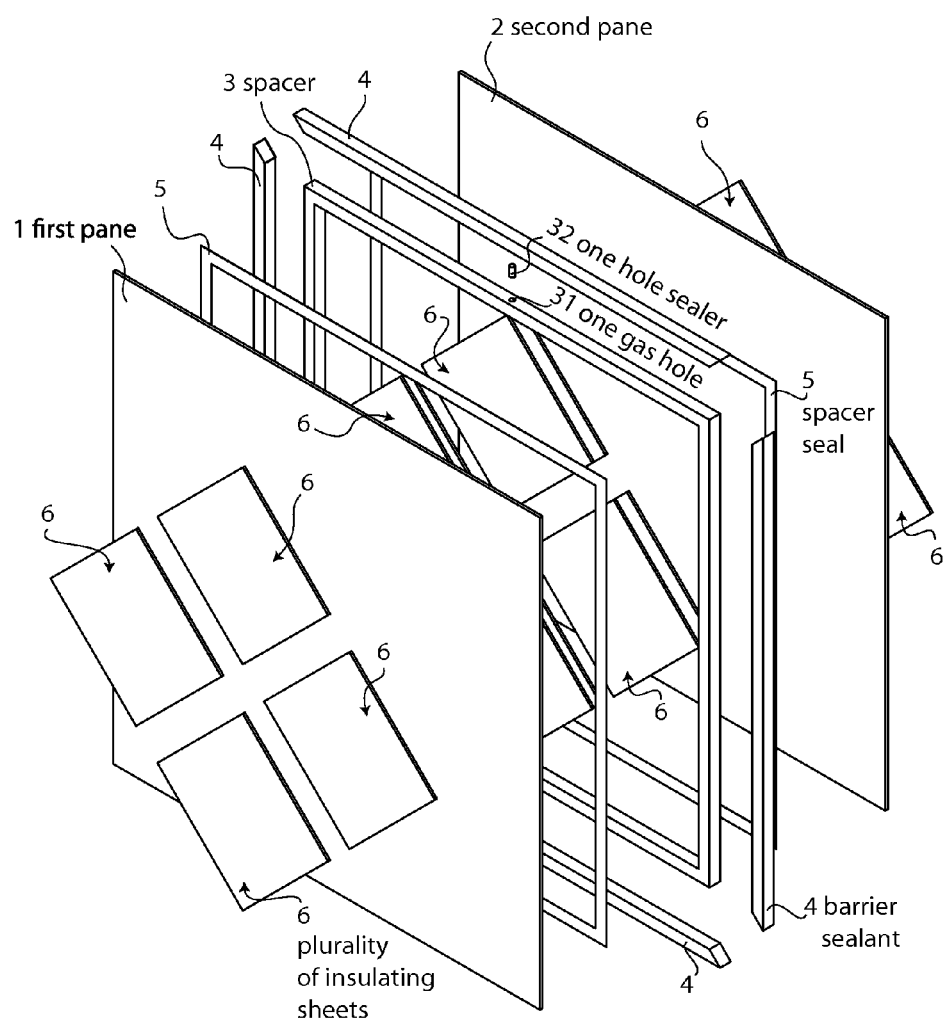
FIG. 5 is an exploded view of another embodiment of the present invention, where the plurality of insulating sheets is multiple shaped sheets that can be patterned onto the first pane and second pane.
Figure 6:
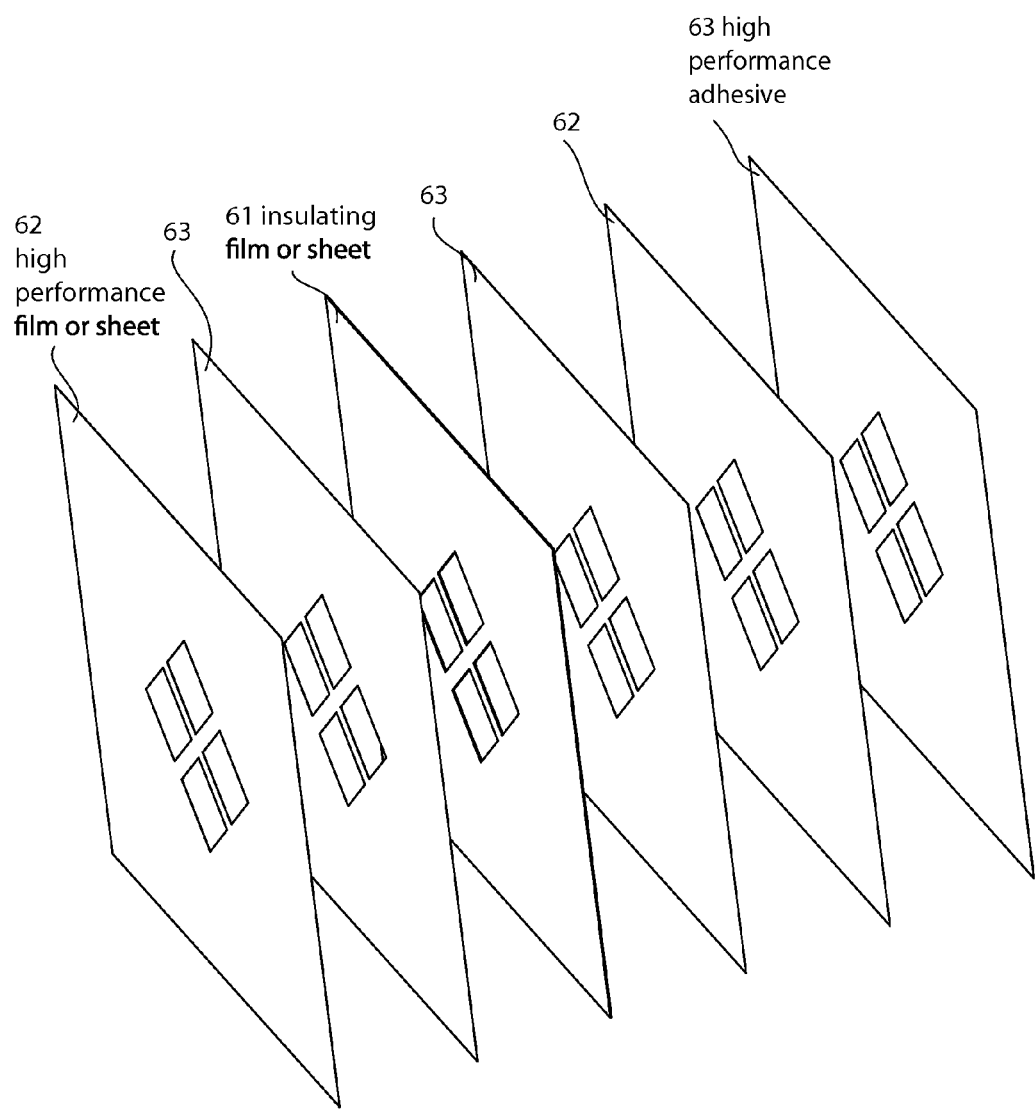
FIG. 6 is an exploded view of the embodiment of the insulating sheet, where there is a plurality of holes traversing through all layers.

In reference to FIG. 3-5, the spacer 3 further comprises of at least one gas hole 31 and at least one hole sealer 32. The barrier sealant 4 is first applied to the spacer 3 sealing the spacer seal 5. The at least one gas hole 31 is a hole that traverses through the first layer of barrier sealant 4 and the spacer 3 into the sealed space. The at least one gas hole 31 provides manufacturers with the ability to draw out air and replace it with the insulating gas. The insulating gas further improves the present invention's ability to insulate heat. The insulating gas can be any gas selected from the group consisting of xenon, argon, nitrogen, or air. Once the insulating gas has been filled into the sealed space through the at least one gas hole 31, the at least one gas hole 31 is sealed by means of the at least one hole sealer 32. The at least one hole sealer 32 is plug component that is inserted and filled into the at least one gas hole 31. Once the at least one gas hole 31 is sealed by the at least one hole sealer 32, the barrier sealant 4 is applied and adheres peripherally about the spacer 3. The barrier sealant 4 is adhered to the first inner surface, the second inner surface, and the spacer 3. The barrier sealant 4 further ensures that the sealed space is hermetically sealed to prevent leakage of the insulating gas.

Figure 2:
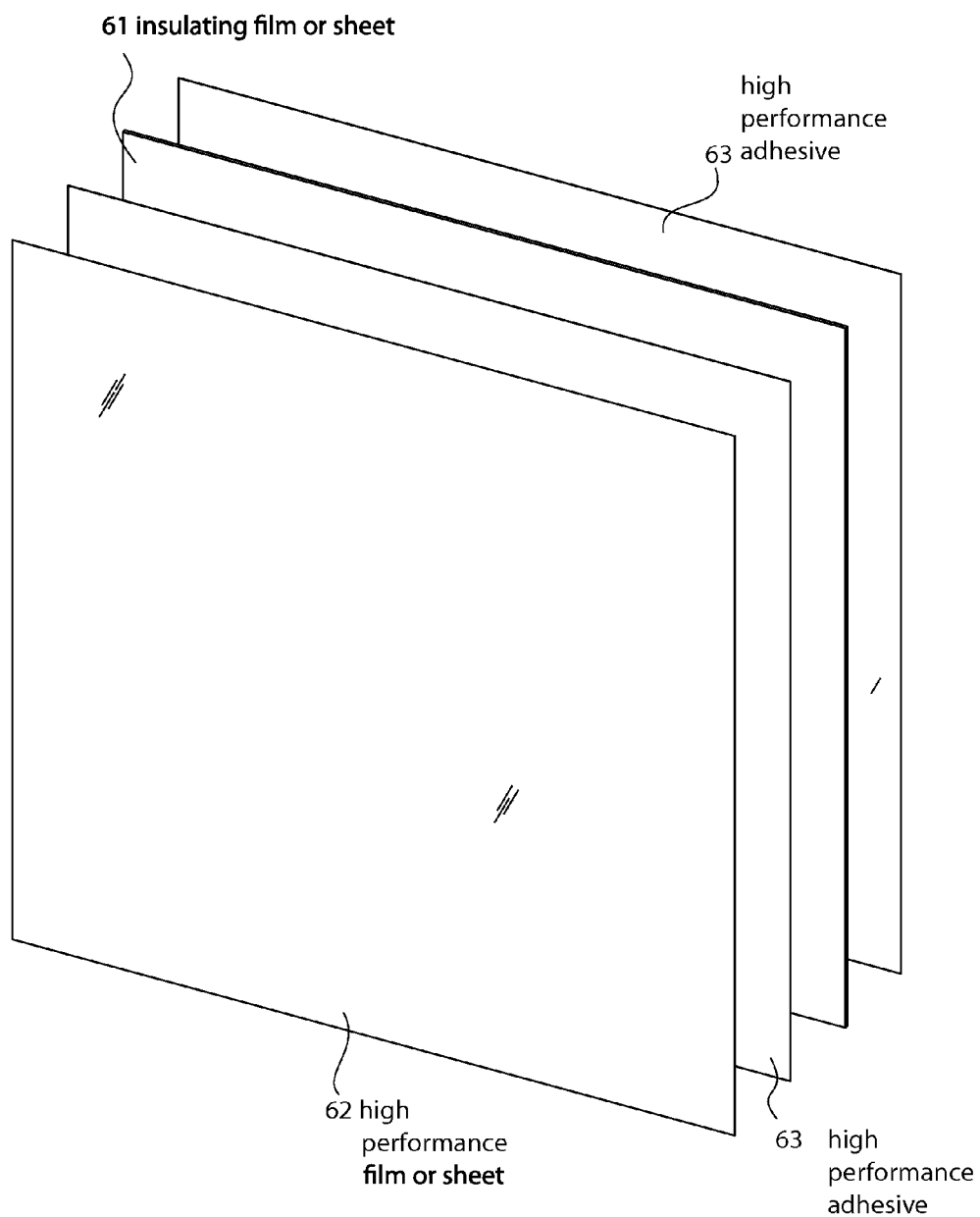
FIG. 2 is an exploded view of an embodiment of the insulating sheet with four layers.

In reference to FIG. 1-2, the insulating properties of the present invention are significantly increased by means of the plurality of insulating sheets 6. Each insulating sheet 6 is a multilayered sheet that provides the present invention with the ability to prevent all forms of heat transfer. Heat travels from warm to cool by means of a combination of conduction, convection, and radiation. According to the Infrared Processing and analysis center at Caltech University (http://coolcosmos.ipac.caltech.edu/cosmic_classroom/light_lessons/thermal/transfer.htm), conduction occurs when objects with two different temperatures are in contact with each other. Heat is transferred through the point or areas of contact until thermal equilibrium is reached between the two objects. Conduction is the movement of heat through a substance by the collision of molecules. Faster-moving molecules that are warmer collide with the slower moving molecules that are cooler. As they collide, the faster molecules give up some of their energy to the slower molecules. The slower molecules gain more thermal energy and collide with other molecules that are cooler. This process continues until heat energy from warmer spreads throughout the cooler. Some substances conduct heat more easily than others. Solids are more often than not better conductor than liquids and liquids are better conductor than gases. Metals are most often very good conductors of heat, while air is very poor conductor of heat. You experience heat transfer by conduction whenever you touch something that is hotter or colder than your skin e.g. when you wash your hands in warm or cold water. In liquids and gases, convection is usually the most efficient way to transfer heat. Convection occurs when warmer areas of a liquid or gas rise to cooler areas in the liquid or gas. As this happens, cooler liquid or gas takes the place of the warmer areas, which have risen higher. This cycle results in a continuous circulation pattern, and heat is transferred to cooler areas. Convection can be observed when water is boiled in a pan. The bubbles of water that rise are the hotter parts of the water rising to the cooler area of water at the top of the pan. Heat energy is transferred by the circulation of the air. Both conduction and convection require matter to transfer heat. Radiation is a method of heat transfer that does not rely upon any contact between the heat source and the heated object. For example, we feel heat from the sun even though we are not touching it. Heat can be transmitted though empty space by thermal radiation. Thermal radiation (often called infrared radiation) is a type electromagnetic radiation (or light). Radiation is a form of energy transport consisting of electromagnetic waves traveling at the speed of light. No mass is exchanged and no medium is required.

With the addition of the insulating sheet, the present invention is able to greatly reduce all three forms of heat transfer. Each insulating sheet 6 comprises an insulating film or sheet 61, at least one high performance film or sheet 62, and a high performance adhesive 63. In the preferred embodiment of the present invention, the insulating sheet 6 having the at least one high performance film or sheet 62 includes a first film and a second film. The first film is aligned and adhered to the insulating film or sheet 61 by the high performance adhesive 63. The second film is aligned and adhered to the insulating film or sheet 61 by the high performance adhesive 63 opposite of the first film. Another layer of the high performance adhesive 63 is coated on the second film opposite to the insulating film or sheet 61. The high performance adhesive 63 can be transparent adhesive including light curing adhesive, structural adhesive, pressure sensitive adhesive, peel and stick adhesive, heat activated adhesives, or a water activated adhesive. The adhesives are optically clear, UV stable, contaminant-free featuring superior clarity, and excellent adhesion resulting in improved bubble resistance when exposed to high humidity and high temperature. In the preferred embodiment of the present invention, the insulating film or sheet 61 is made from the material X-aerogel with a thickness of 1/16 inch. The insulating film or sheet 61 can be thinner or thicker depending on the manufacturer's or designer's desire. X-aerogels are an optically transparent or translucent polymer cross-linked aerogel that is suitable to withstand the earth's thermal cycle. The pores on the X-aerogel formed as an insulating film or sheet 61 have very small pore diameters ranging from 10 to 50 nanometers, although future advancements that become commercially available in the future may vary. There are some X-aerogels that are optically transparent or translucent. Certain X-aerogel formulations feature good optical transparency while maintaining good insulating properties. Many other combinations of cross linkers and surface functional groups are confirmed to even further desirable properties of X-aerogels. Although there are many suitable X-aerogels, just one specific reference to a suitable X-Aerogel shall be formed into said insulating layer as a component for the present invention is found on document id reference LEW-17685-1, LEW-18017-1 dated Feb. 28, 2011 published by the Glenn Research Center Technology, Transfer and Partnership Office. Specifically illustrated by the photograph is a suitable X-aerogel formed into a block undergoing a three point deflection (bending) test. This X-Aerogel, along with other suitable X-aerogels, although formed as a flat layer (laminate) are well suited once fully manufactured to be laminated with said films for the present invention. The X-aerogel insulating material in the photograph shown in document LEW-17685-1 and LEW-18017-1 being bent is highly insulating, durable, and allows light through, flexible and is easily formed so well suited when formed into said insulating layer for the present invention. Other suitable emerging gel technologies can also be used as the material for the insulating film or sheet 61, including although not limited to suitable, eventual gel technology advancements associated with maerogel, Cabot aerogel, and Svensk Aerogel AB versions of Aerogel and advancements thereof that may be made commercially available in the future. However, NASA and associates said optically transparent and translucent X-aerogel material and improvements thereof formed as a film or sheet is the preferred super-insulating material. The X-aerogel material is mechanically strong, flexible, vibration dampening, optically transparent or translucent, ultra-light weight, and possesses an extremely low thermal conductivity. The X-aerogel is also mechanically far stronger compared to an unmodified and traditional aerogel. The at least one high performance film or sheet 62 can be any suitable, high performance film selected from the group consisting of graphic screen-printing films, safety security films, conformal films, decorative films, weather resistant films, flame retardant films, temperature resistant films, chemical resistant films, radiant heat reflective films, UV stabilized films, colored films, coated films, light diffusing films, optically clear films, translucent films, water resistant films, abrasion resistant films, or glare reduction films. The at least one high performance film or sheet 62 used can be manufactured by the leading international manufacturers including but not limited to 3M, LLumar, CPFilms, Solutia, Bekaert, Madico, Bayer Material Science high performance films, Johnson Window films, and Hanita high performance films. However, in the preferred embodiment, the at least one high performance film or sheet 62 is a radiant heat reflective and damaging UV blocking UV stable transparent film. Additionally, certain high performance films offer affordable energy-saving solutions to businesses and homes by rejecting a majority of solar heat. Resultantly, air conditioning system efficiencies is improved to save on energy costs and reduce carbon dioxide emissions. Although window films do not really insulate against heat transferred by conduction, they are able to prevent heat transfer through the present invention by reflecting radiant heat and UV rays. The stoppage of UV radiation prevents any long-term damaging effects to the high performance adhesive 63 or the X-aerogel within the assembly. The present invention is able to reflect radiant heat with the at least one high performance film or sheet 62 or stop radiant heat by means of the X-aerogel film or sheet. Conduction heat transfer is prevented and stopped by the X-aerogel film. Convection heat transfer is stopped both by the at least one high performance film or sheet 62 and the X-aerogel film.

In reference to FIG. 2, in another embodiment of the present invention, each of the insulating film or sheets 6 comprises an insulating film or sheet 61, a single high performance film or sheet 62, and adhesive high performance adhesive 63. The resulting insulating sheet 6 is a four layer sheet including the high performance adhesive 63. In this embodiment, the high performance film or sheet 62 is aligned and adhered to the insulating film or sheet 61 by the high performance adhesive 63. The high performance adhesive 63 is then coated on the side of the insulating film or sheet 61 opposite of the high performance film or sheet 62.

In reference to FIG. 3-5, the plurality of insulating sheets 6, having a first sheet 601, a second sheet 602, a third sheet 603, and a fourth sheet 604, are applied to all surfaces of the first pane 1 and the second pane 2. In an embodiment of the present invention, the first sheet 601 is adhered to the first outer surface by the high performance adhesive 63. The second sheet 602 is adhered to the first inner surface by the high performance adhesive 63 within the sealed space. The third sheet 603 is adhered to the second inner surface by the high performance adhesive 63 within the sealed space. The fourth sheet 604 is adhered to the second outer surface by the high performance adhesive 63. The second sheet 602 and the third sheet 603 are adhered to the first inner surface and the second inner surface without passing the spacer 3. The size of the second sheet 602 and the third sheet 603 are smaller than the first pane 1 and the second pane 2 to ensure that the spacer 3 is directly sealed to the glazing. It is preferred that the high performance adhesive 63 on the side of the insulating sheets 6 is bonded to the first pane 1 and the second pane 2 by factory pre-applied, using pressure sensitive or water activated, adhesives. In another embodiment of the present invention, the plurality of films can be shaped into characters, trademarks, symbols, letterings, decorative shapes, and logos. Yet, in another embodiment of the present invention, the plurality of insulating sheets 6 can possess holes clear through the sheet in different shapes to provide the users with an area on the IGU to view through.

Figure 7:
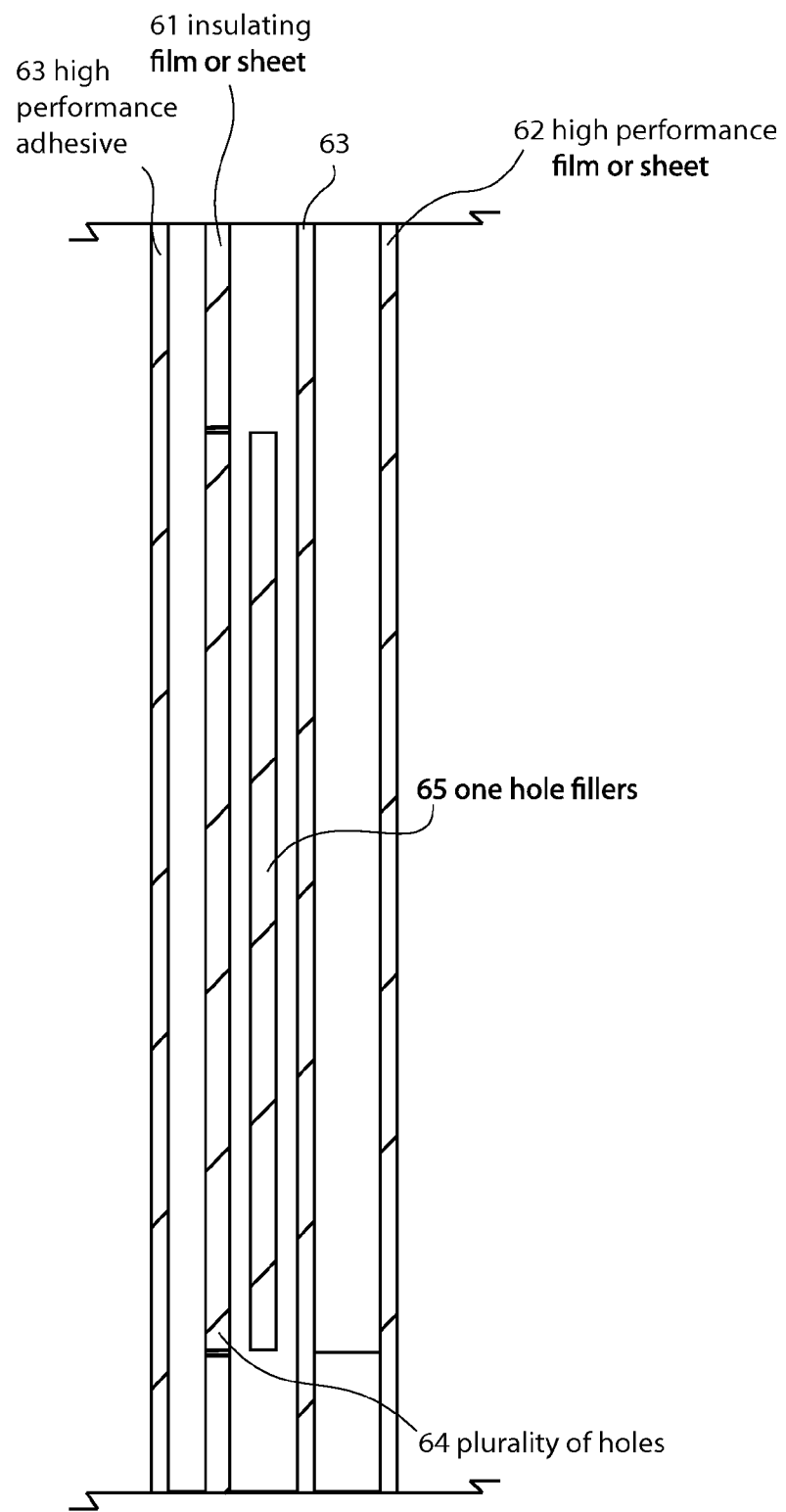
FIG. 7 is a cross sectional detailed view of another embodiment of the present invention, where the insulating X-aerogel film comprises of at least one hole that is filled with completely transparent hole filler made of non-X-aerogel film consistent with the films sandwiching said interior materials. Transparent polycarbonate glazing may also be formed as the hole filler. The two exterior films sandwiching the interior materials has no holes as they are continuous although could in certain applications if ever specified.

In reference to FIG. 7, in another embodiment of the present invention, the insulating film or sheet 61 further comprises of a plurality of holes 64. In this embodiment, the high performance film or sheet 62 consists of a first film, a second film, and of a plurality of hole fillers 65. The first film is aligned and adhered to the insulating film or sheet 61 by the high performance adhesive 63. The plurality of hole fillers 65 is correspondingly fitted into the plurality of holes 64. The plurality of hole fillers 65 is inserted into the plurality of holes 64 to provide a flush fit between the higher performance film or sheet 62 and the insulating film or sheet 61. The second film is aligned and adhered to the side of the insulating film or sheet 61 opposite of the first film. Similarly, the high performance adhesive 63 is applied to the insulating film or sheet 61 opposite of the high performance film or sheet 62. In this embodiment of the present invention, the plurality of holes 64 in the insulating film or sheet 61 provide the user with an area to view through the window.

Figure 8:
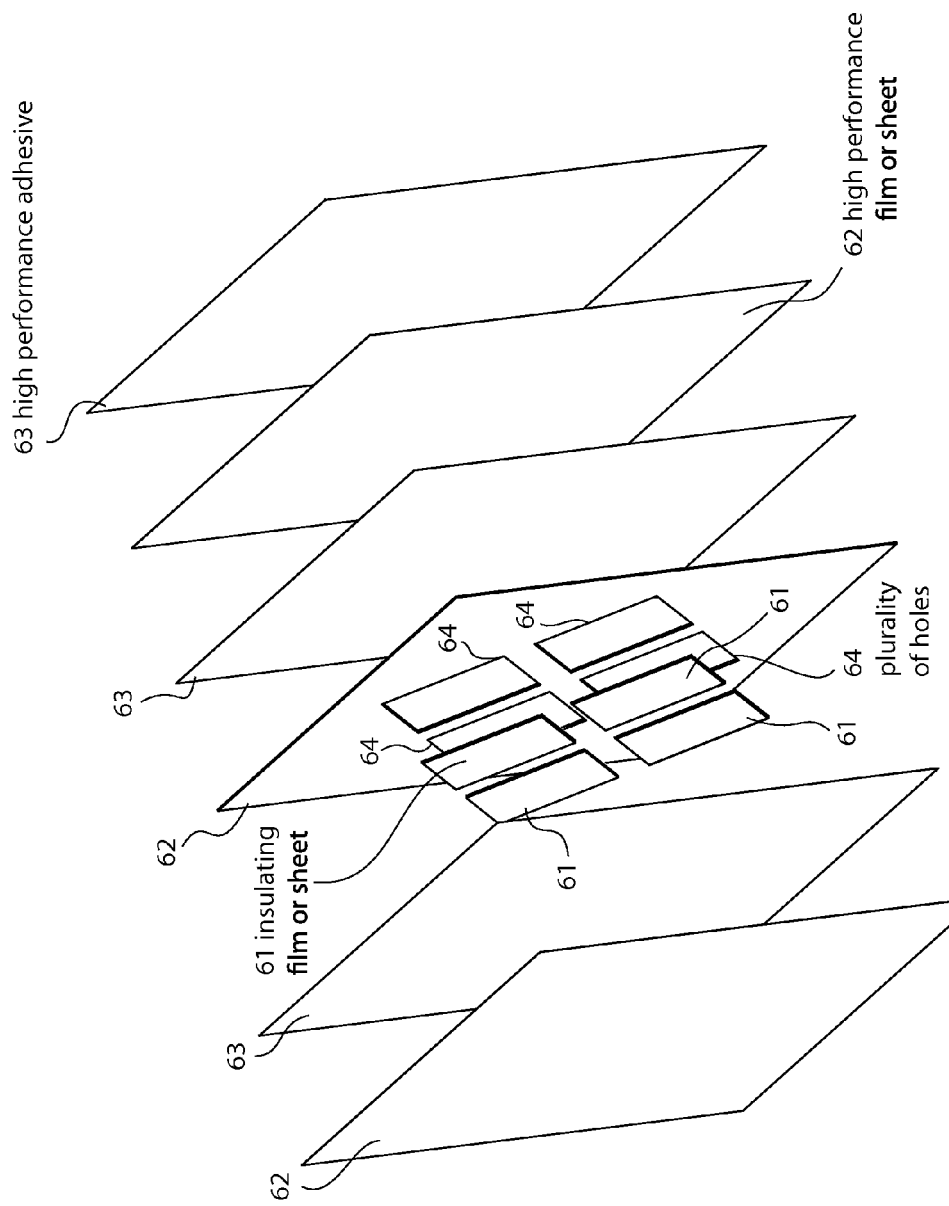
FIG. 8 is an exploded view of the embodiment of the insulating sheet, where the plurality of holes traverses through only a center transparent film. The plurality of X-aerogel insulating films is fitted into the plurality of holes.

In reference to FIG. 8, in another embodiment of the present invention, the plurality of holes 64 is positioned on the at least one high performance film or sheet 62. In this embodiment of the present invention, there is at least one insulating film or sheet 61. Each of the insulating films 61 are shaped consistently with the plurality of holes 64. The at least one high performance film or sheet 62 includes a first film, a second film, and a third film. The plurality of holes 64 is positioned on the second film. The second film is sandwiched between the first film and the second film. The first film is aligned and adhered to the second film by the high performance adhesive 63. The at least one insulating film or sheet 62 is aligned to and inserted into the plurality of holes 64. The third film is aligned and adhered to the side of the second film opposite of the first film by the high performance adhesive 63. The at least one insulating film or sheet 61 are inserted into the plurality of holes 64 to provide a flush fit between the plurality of insulating sheets 6 with the first pane 1 or second pane 2. Similarly, the high performance adhesive 63 is applied to the third film opposite of the second film.

Figure 9:
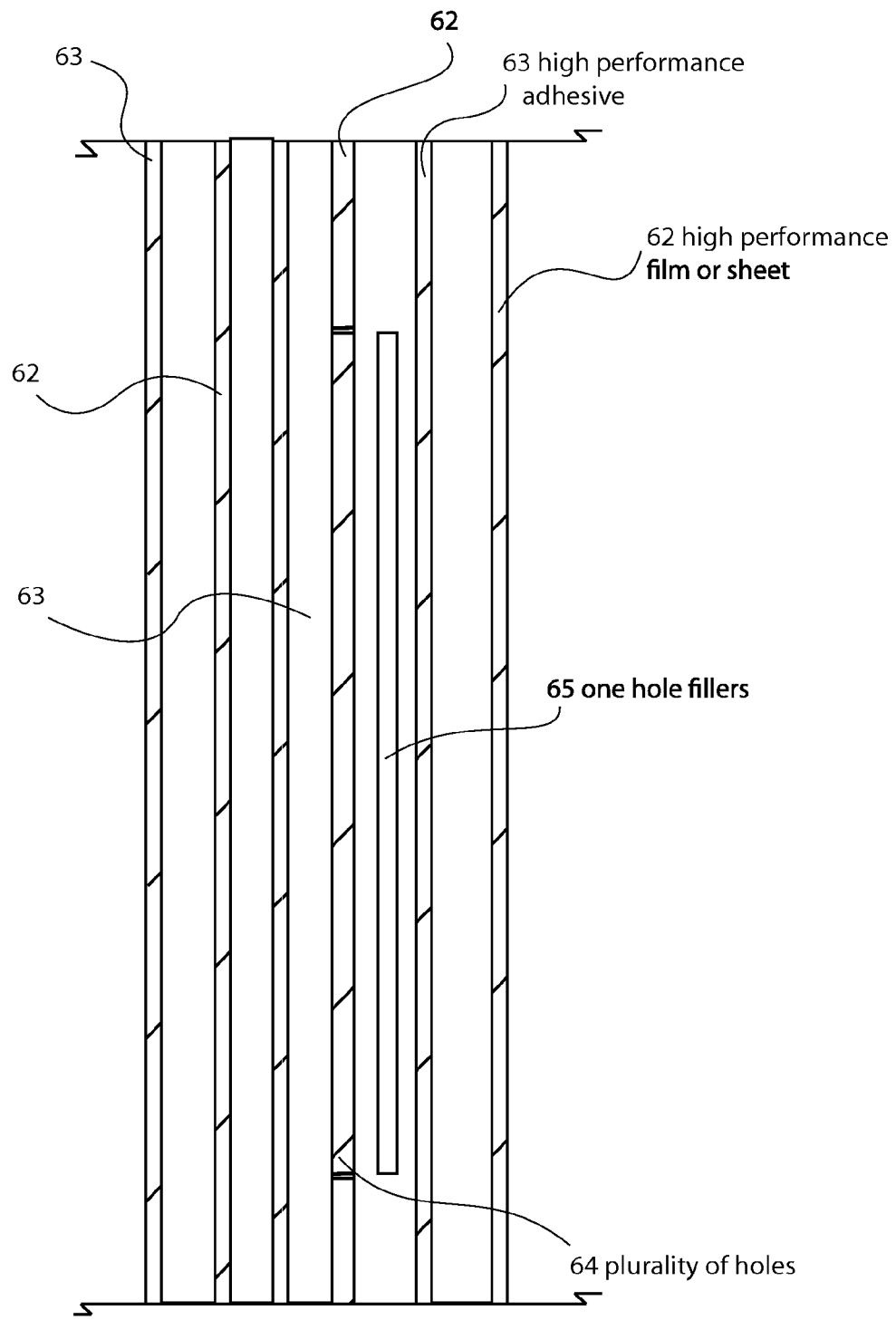
FIG. 9 is a cross sectional detailed view of another embodiment of the present invention, where the insulating X-aerogel film manufactured with the plurality of holes. The plurality of holes is filled with the plurality of hole fillers consistent with films sandwiching the interior materials.
Figure 10:
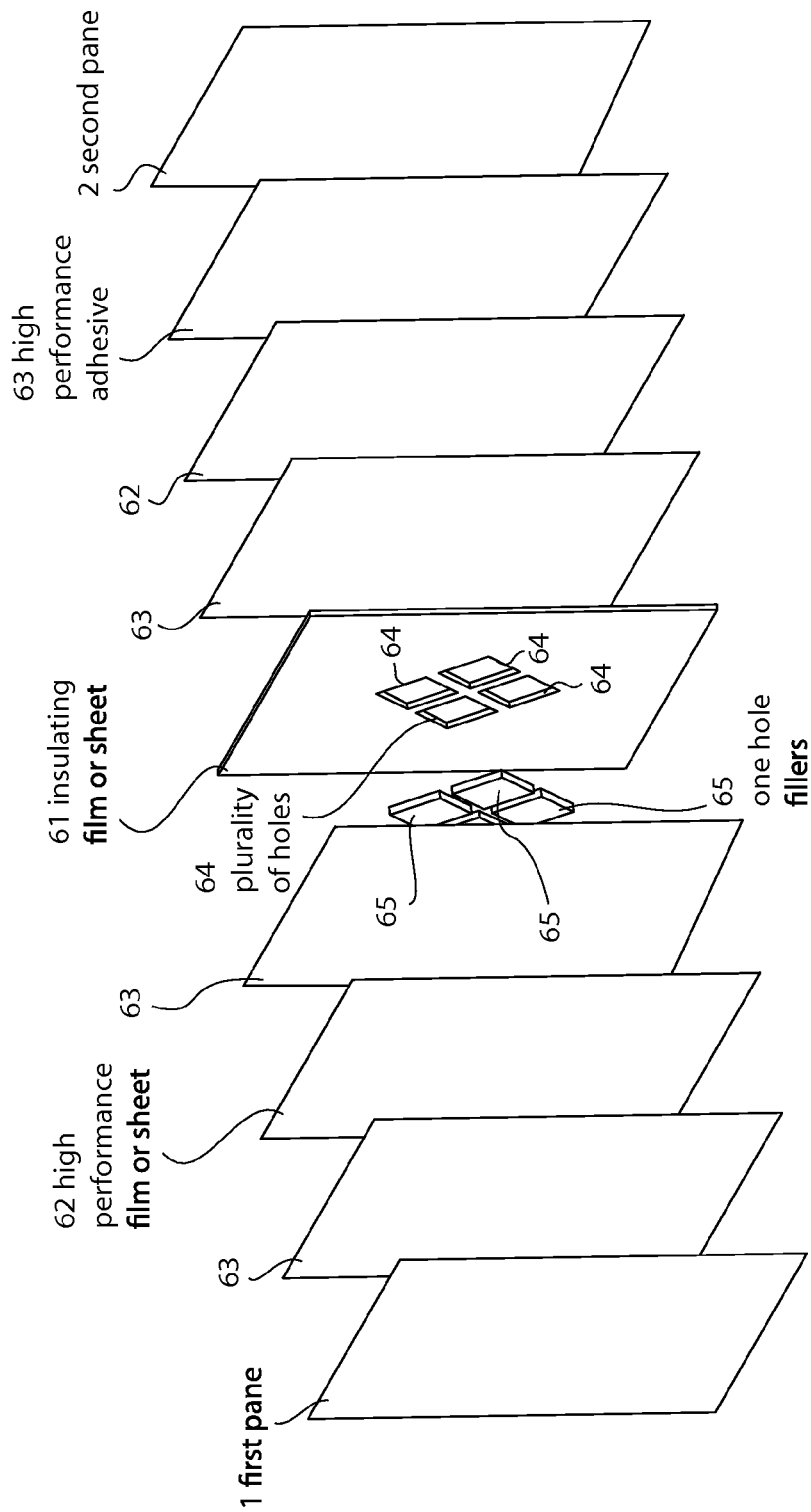
FIG. 10 shows an embodiment of the present invention, where the insulating sheet is sandwiched in between two layers of glazing. The insulating film is a quarter inch thick with a plurality of the transparent hole fillers being inserted into the at least one hole. The insulating film is sandwiched by two films by the adhesive. There is no space left for an IGU spacer as the X-aerogel layer, film, and adhesive also serve as the IGU spacer.
Figure 11:
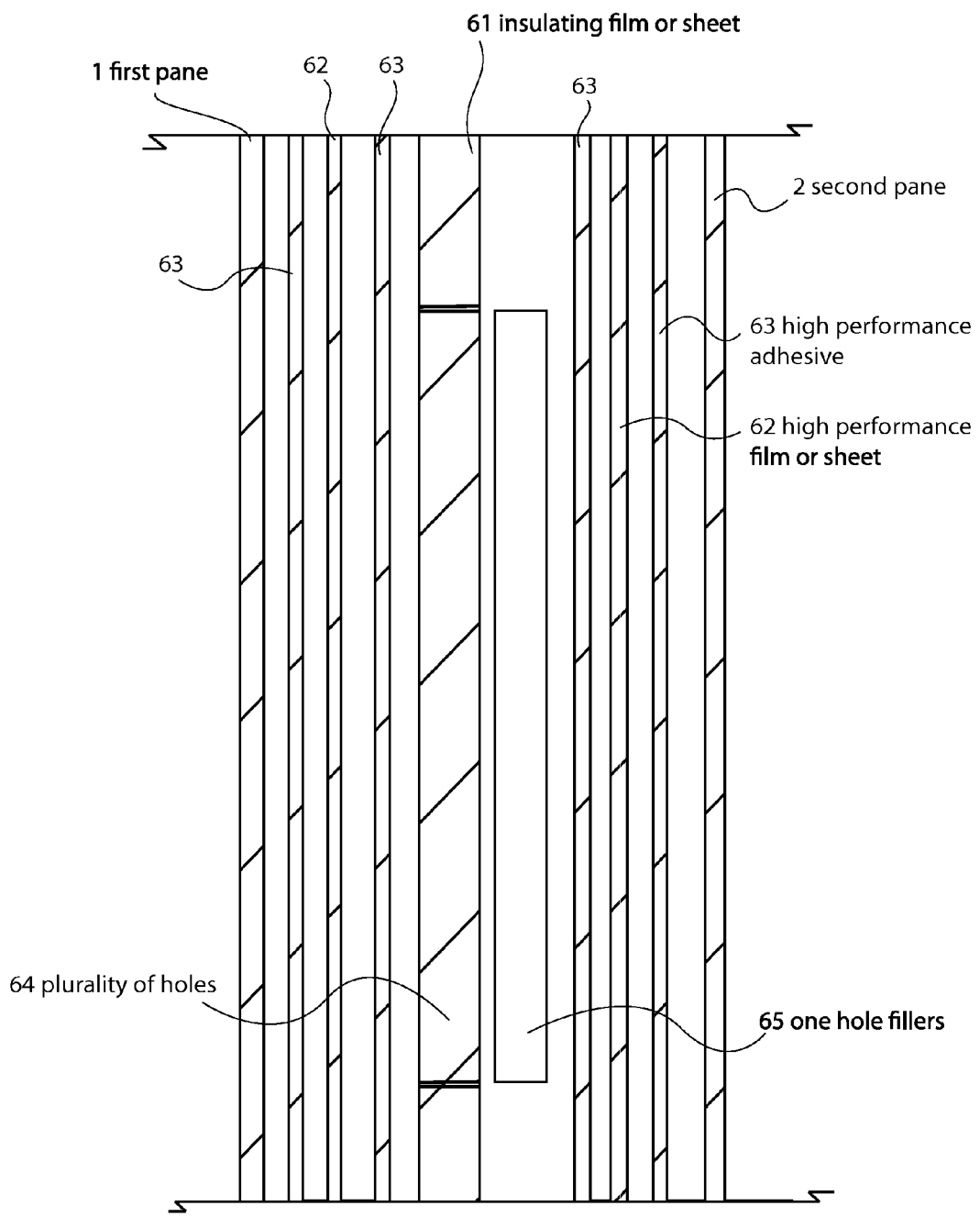
FIG. 11 is a cross sectional detailed view of the embodiment shown in FIG. 10.
Figure 12:
FIG. 12 illustrates an artist's rendition featuring a decorative design that includes clearer areas not at all obscured by optically transparent or translucent gel technology insulating materials. Areas having less clarity represent the presence of optically transparent or translucent gel technology insulating materials that reduce heat transfer to primarily include heat transferred by means of conduction.
Figure 13:
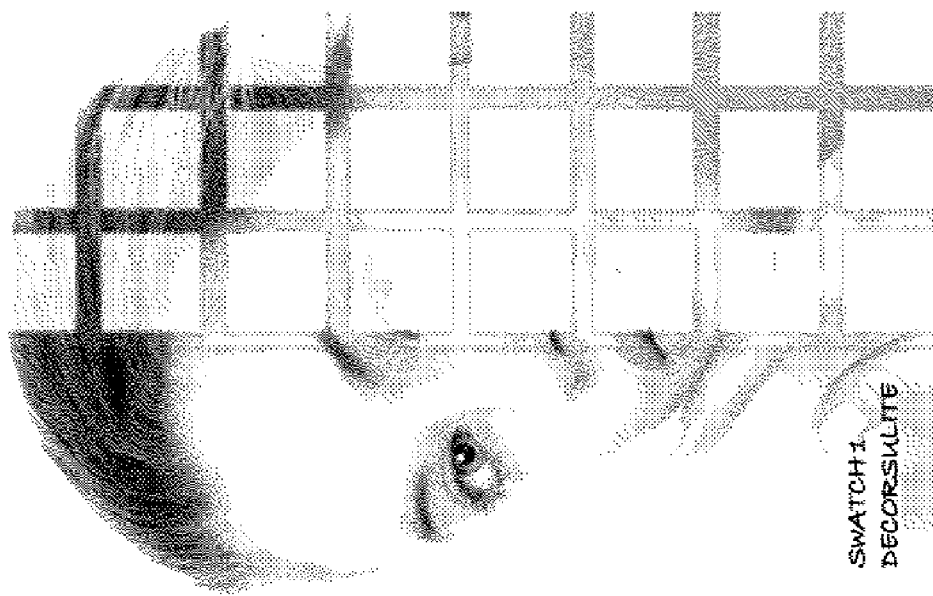
FIG. 13 illustrates an artist's rendition featuring a decorative design that includes clearer areas not at all obscured by optically transparent or translucent gel technology insulating materials. Areas having less clarity represent the presence of optically transparent or translucent gel technology insulating materials that reduce heat transfer to primarily include heat transferred by means of conduction.
Figure 14:
FIG. 14 illustrates an artist's rendition featuring a decorative design that includes clearer areas not at all obscured by optically transparent or translucent gel technology insulating materials. Areas having less clarity represent the presence of optically transparent or translucent gel technology insulating materials that reduce heat transfer to primarily include heat transferred by means of conduction.
Figure 16:
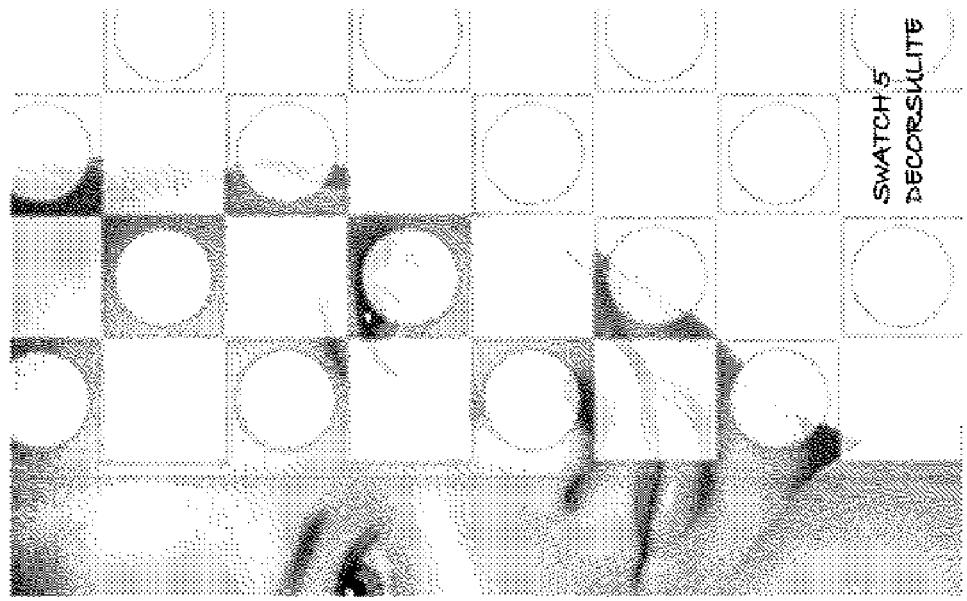
FIG. 16 illustrates an artist's rendition featuring a decorative design that includes clearer areas not at all obscured by optically transparent or translucent gel technology insulating materials. Areas having less clarity represent the presence of optically transparent or translucent gel technology insulating materials that reduce heat transfer to primarily include heat transferred by means of conduction.
Figure 15:
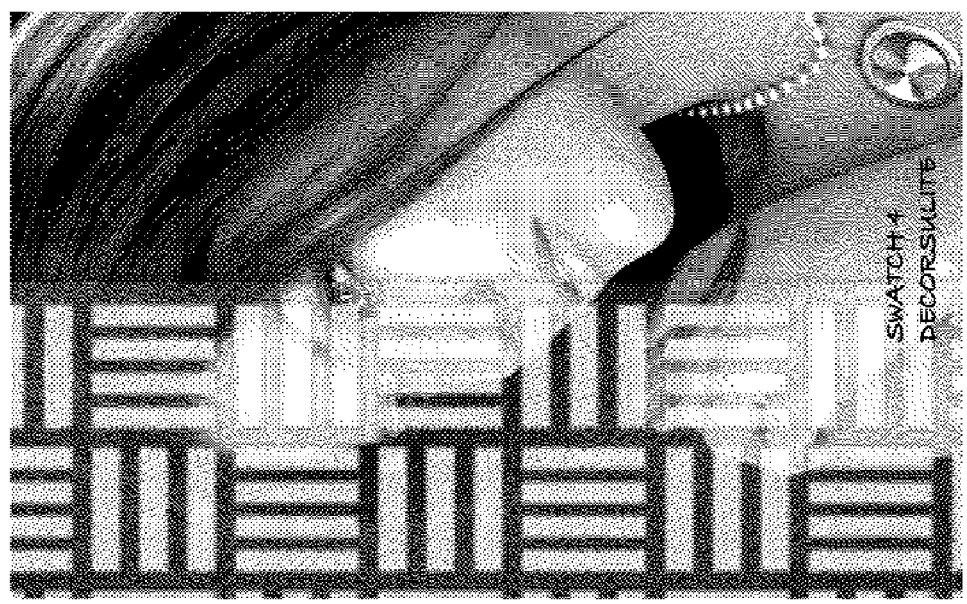
FIG. 15 illustrates an artist's rendition featuring a decorative design that includes clearer areas not at all obscured by optically transparent or translucent gel technology insulating materials. Areas having less clarity represent the presence of optically transparent or translucent gel technology insulating materials that reduce heat transfer to primarily include heat transferred by means of conduction.
Figures 17, 18:
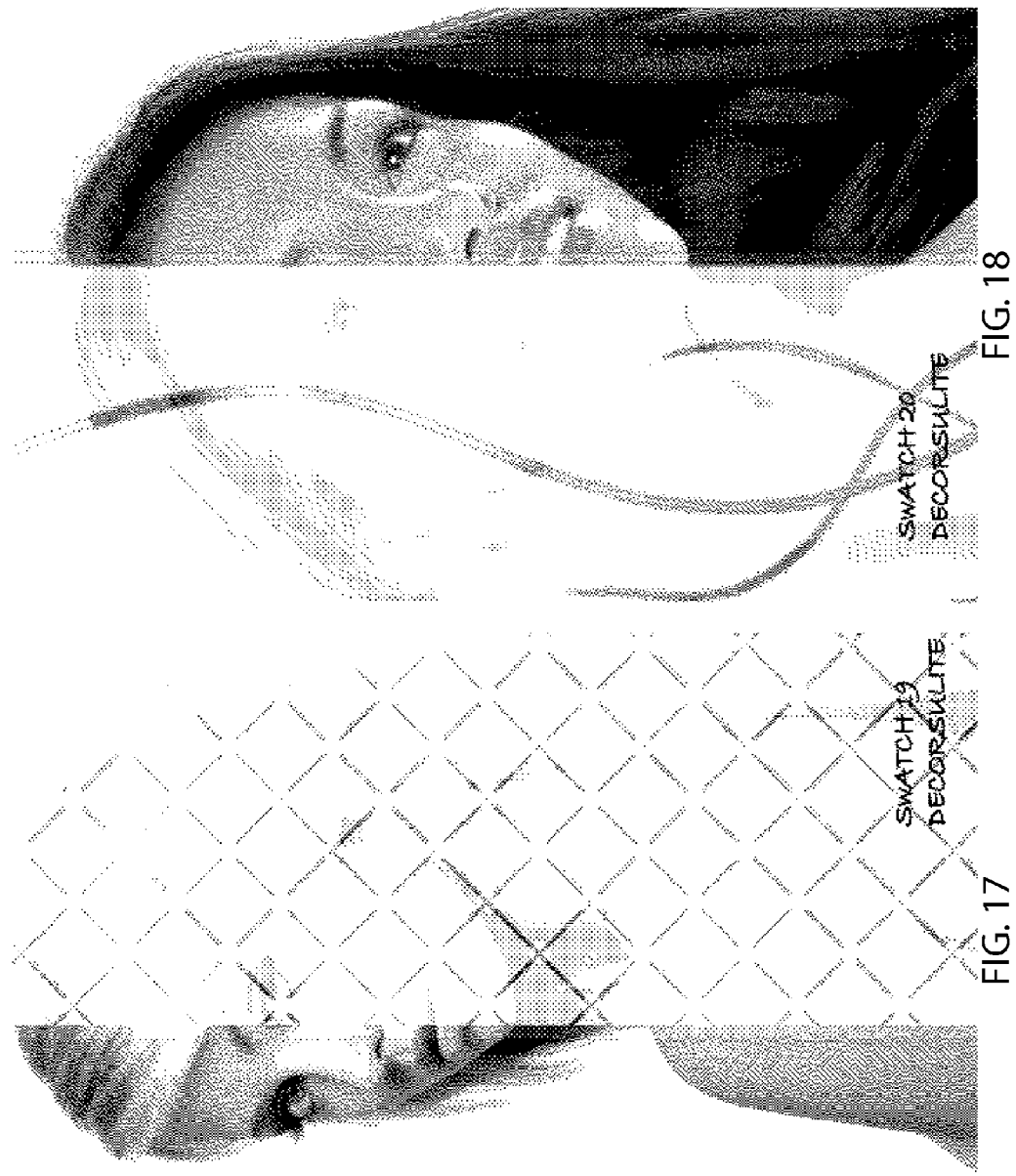
FIG. 17 illustrates an artist's rendition featuring a decorative design that includes clearer areas not at all obscured by optically transparent or translucent gel technology insulating materials. Areas having less clarity represent the presence of optically transparent or translucent gel technology insulating materials that reduce heat transfer to primarily include heat transferred by means of conduction.
FIG. 18 illustrates an artist's rendition featuring a decorative design that includes clearer areas not at all obscured by optically transparent or translucent gel technology insulating materials. Areas having less clarity represent the presence of optically transparent or translucent gel technology insulating materials that reduce heat transfer to primarily include heat transferred by means of conduction.
Figure 20:
FIG. 20 illustrates an artist's rendition featuring a decorative design that includes clearer areas not at all obscured by optically transparent or translucent gel technology insulating materials. Areas having less clarity represent the presence of optically transparent or translucent gel technology insulating materials that reduce heat transfer to primarily include heat transferred by means of conduction.
Figure 19:
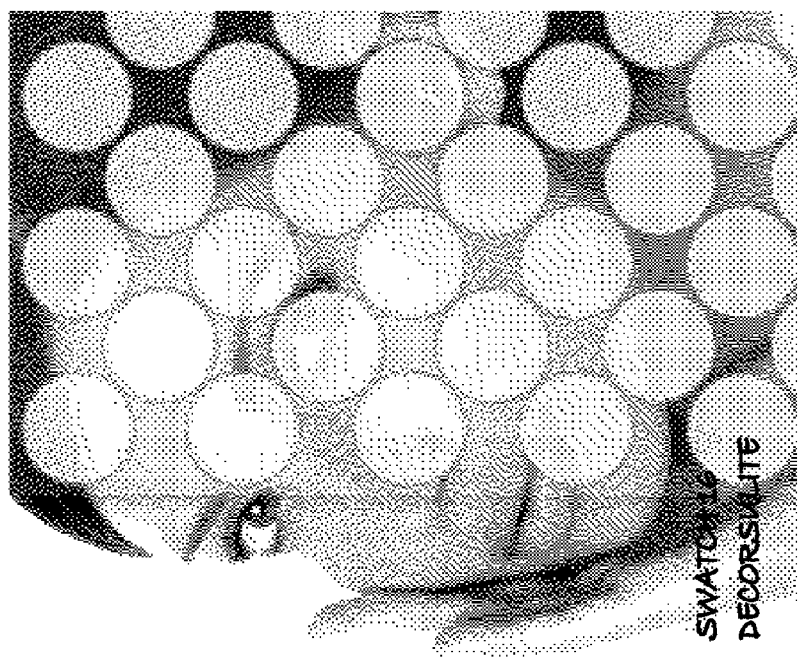
FIG. 19 illustrates an artist's rendition featuring a decorative design that includes clearer areas not at all obscured by optically transparent or translucent gel technology insulating materials. Areas having less clarity represent the presence of optically transparent or translucent gel technology insulating materials that reduce heat transfer to primarily include heat transferred by means of conduction.

In reference to FIG. 9-10, in another embodiment of the present invention, the insulating glazing unit does not comprise a separate edge spacer. The insulating sheet 6 is sandwiched between the first pane 1 and the second pane 2. The system is held together by means of the high performance adhesive 63. The insulating sheet 6 completely fills in the space between the first pane 1 and the second pane 2. In the preferred embodiment of the present invention, the insulating film or sheet 61 is a quarter of an inch thick having at least one hole 64. The plurality of holes 64 are filled by the at least one hole fillers 65. The at least one hole fillers 65 are preferred to be made from a material consistent with the at least one high performance film or sheet 62 although the filler may be made from clear polycarbonate glazing.

In reference to FIG. 4-5, regardless of the holes as shapes representing logos, trademarks, letterings, or characters that are given to the plurality of insulating sheets, the shapes are to be matching for each insulating sheet and positioned in line on every glazing layer surface. As a result, in the embodiment of the double pane glazing unit, the holes or shapes provided by the insulating sheets are to be inline on the first sheet, the second sheet, the third sheet, and the fourth sheet. The shapes are to be formed in an organized manner with proper or desirable coordination or relation between components. The arrangement of the plurality of insulating sheets provides the window with coordinated areas where there is no optically transparent or translucent X-aerogels. The clearer areas can be viewed through aside from the areas having the X-aerogel.

Although the present invention is a super-insulating IGU said films assemblies may also be used as high-performance aftermarket window film systems for providing aesthetics, additional comfort, energy savings, security, soundproofing and for safety purposes when applied to existing glazing in commercial and residential buildings as well as other conditioned spaces. Although it is difficult to apply said films assemblies inside of an existing insulated sealed glass unit's interior cavity, outside glazing surfaces are readily accessible and therefore well suited for aftermarket applications. Energy-saving aftermarket applications for commercial business and residential home window glazing can be improved upon in regard to the efficiency of heating and cooling systems while saving energy expenses and for reducing $CO_2$ emissions.

Furthermore, although the present invention is a super-insulating IGU said films assemblies may also be used for suitable electronic displays, touch screens, medical devices, energy, and products requiring protective, insulating optically transparent or translucent film systems to especially to include applications that are exposed to the outside elements or where heat transfer and UV protection is necessary. Said insulating film or sheet 6 and high performance film or sheet assembles may also be used as an aftermarket window film for placement on aftermarket glass and other suitable surfaces, not only limited to use with new insulating glass units (IGU). Although optically transparent and translucent NASA X-aerogels may be used as the insulating film or sheet, all other suitable emerging aerogel films or sheets may be used including, although not limited to, NASA and their associates' aerogel films or sheets that are made without silica. NASA and their associates' X-aerogel and non-silica polymer based aerogel films or sheets are also known to reduce sound and vibration.

In another embodiment of the present invention, the plurality of insulating sheets 6 can be used independently. The insulating sheets 6 can be used as insulation within or on the surface of walls. However, when used in or on a wall surface application, the insulating film or sheet 61 is not required to be transparent or translucent although can be in suitable applications.

In yet another embodiment of the present invention, there can be more than two panes of glazing for a triple pane glazing unit, where each surface is also laminated with the plurality of insulating sheets 6.

Although the invention has been explained in relation to its preferred embodiment, it is to be understood that many other possible modifications and variations can be made without departing from the spirit and scope of the invention as hereinafter claimed.

What is claimed is:

1. An aerogel window film system comprises,
   a first pane;
   a second pane;
   a spacer;
   a barrier sealant;
   a center layer;
   two transparent layers;
   a spacer seal;
   an insulating gas;
   a plurality of insulating sheets, wherein the plurality of insulating sheets consist of a first sheet, a second sheet, a third sheet and a fourth sheet;
   the center layer being an aerogel layer, and the aerogel layer comprising at least one hole; the at least one hole being filled with a transparent material, wherein said transparent material is not aerogel;
   the plurality of insulating sheets comprises a insulating film, at least one film, and an adhesive;
   the first pane having a first inner surface and a first outer surface;
   the second pane having a second inner surface and a second outer surface;
   the spacer comprises at least one gas hole and at least one hole sealer; and
   one of the two transparent layers being attached to the first outer surface with a transparent adhesive, and the other one of the two transparent layers being attached to the second outer surface with the transparent adhesive.

2. The aerogel window film system as claimed in claim 1 comprises,
   the spacer being peripherally adhered to the first inner surface of the first pane by the spacer seal;
   the second pane being aligned and adhered to spacer opposite of the first pane; and
   the spacer being peripherally adhered to the second inner surface of the second pane by the spacer seal.

3. The aerogel window film system as claimed in claim 2 comprises,
   the spacer, the first pane, and the second pane defining a sealed space;
   the at least one gas hole being traversed through the spacer into the sealed space;
   the at least one gas hole being sealed by the at least one hole sealer;
   the barrier sealant being peripherally adhered to the first inner surface, the second inner surface and the spacer; and
   the sealed space being filled with the insulating gas.

4. The aerogel window film system as claimed in claim 2 comprises,
   each insulating sheet being shaped to any shape, wherein each insulating film can be uniquely shaped into trademarks, symbols, lettering, decorative shapes, logos, or have holes all positioned inline on the first pane and second pane;
   each insulating sheet having the at least one film includes a first film and second film;
   the first film being aligned and adhered to the insulating film by the adhesive;
   the second film being aligned and adhered to the insulating film by the adhesive opposite of the first film; and
   the adhesive being coated to the second film opposite of the insulating film.

5. The aerogel window film system as claimed in claim 4 comprises,
   the first sheet being adhered to the first outer surface by the adhesive;
   the second sheet being adhered to the first inner surface by the adhesive within the sealed space;
   the third sheet being adhered to the second inner surface by the adhesive within the sealed space; and
   the fourth sheet being adhered to the second outer surface by the adhesive.

6. The aerogel window film system as claimed in claim 1 comprises,
   the at least one film being a film selected from the group consisting of graphic screen-printing films, safety security films, decorative films, weather resistant films, flame retardant films, conformal film, temperature resistant films, chemical resistant films, radiant heat reflective films, UV stabilized films, colored films, coated films, light diffusing films, optically clear films, translucent films, water resistant films, abrasion resistant films, or glare reduction films;
   the insulating film being made from a material selected from the group consisting of X-aerogel, wherein the X-aerogel film is able to provide heat and sound insulation; and
   the adhesive being a transparent adhesive selected from the group consisting of light curing adhesive, heat activated adhesive, structural adhesive, pressure sensitive adhesive, peel and stick adhesive, or a water activated adhesive.

7. The aerogel window film system as claimed in claim 1 comprises,
   wherein the plurality of insulating sheets are matching and inline with consistent designs on the first outer surface, the first inner surface, the second inner surface, and the second outer surface.

8. The aerogel window film system as claimed in claim 1 comprises,
   wherein the plurality of insulating sheets are consistently shaped and consistently aligned on the first outer surface, the first inner surface, the second inner surface, and the second outer surface with each sheet aligned and the areas without the plurality of insulating sheets aligned.

9. An aerogel window film system comprises,
   a first pane;
   a second pane;
   a spacer;
   a barrier sealant;

a center layer;
two transparent layers;
a spacer seal;
an insulating gas;
a plurality of insulating sheets, wherein the plurality of insulating sheets consist of a first sheet, a second sheet, a third sheet and a fourth sheet;
the center layer being an aerogel layer, and the aerogel layer comprising at least one hole; the at least one hole being filled with a transparent material, wherein said transparent material is not aerogel;
the plurality of insulating sheets comprises a insulating film, a film, and an adhesive;
the first pane having a first inner surface and a first outer surface;
the second pane having a second inner surface and a second outer surface;
the spacer comprises at least one gas hole and at least one hole sealer;
one of the two transparent layers being attached to the first outer surface with a transparent adhesive, and the other one of the two transparent layers being attached to the second outer surface with the transparent adhesive; and
the plurality of insulating sheets are matching and inline with consistent designs on the first outer surface, the first inner surface, the second inner surface, and the second outer surface.

10. The aerogel window film system as claimed in claim 9 comprises,
the spacer being peripherally adhered to the first inner surface of the first pane by the spacer seal;
the second pane being aligned and adhered to spacer opposite of the first pane;
the spacer being peripherally adhered to the second inner surface of the second pane by the spacer seal; and
the at least one gas hole being traversed through the spacer.

11. The aerogel window film system as claimed in claim 10 comprises,
the spacer, the first pane, and the second pane defining a sealed space;
the at least one gas hole being traversed through the spacer into the sealed space;
the at least one gas hole being sealed by the at least one hole sealer;
the barrier sealant being peripherally adhered to the first inner surface, the second inner surface and the spacer; and
the sealed space being filled with the insulating gas.

12. The aerogel window film system as claimed in claim 10 comprises,
each insulating sheet being shaped to any shape, wherein each insulating film can be uniquely shaped into trademarks, symbols, lettering, decorative shapes, logos, or have holes all positioned inline on the first pane and second pane;
the film being aligned and adhered to the insulating film by the adhesive; and
the adhesive being applied to the insulating film opposite of the film.

13. The aerogel window film system as claimed in claim 12 comprises,
the first sheet being adhered to the first outer surface by the adhesive;
the second sheet being adhered to the first inner surface by the adhesive within the sealed space;
the third sheet being adhered to the second inner surface by the adhesive within the sealed space; and
the fourth sheet being adhered to the second outer surface by the adhesive.

14. The aerogel window film system as claimed in claim 9 comprises,
the at least one film being a film selected from the group consisting of graphic screen-printing films, safety security films, decorative films, weather resistant films, flame retardant films, conformal film, temperature resistant films, chemical resistant films, radiant heat reflective films, UV stabilized films, colored films, coated films, light diffusing films, optically clear films, translucent films, water resistant films, abrasion resistant films, or glare reduction films;
the insulating film being made from a material selected from the group consisting of X-aerogel, wherein the X-aerogel film is able to provide heat and sound insulation; and
the adhesive being a transparent adhesive selected from the group consisting of light curing adhesive, heat activated adhesive, structural adhesive, pressure sensitive adhesive, peel and stick adhesive, or a water activated adhesive.

15. The aerogel window film system as claimed in claim 9 comprises,
wherein the plurality of insulating sheets are consistently shaped and consistently aligned on the first outer surface, the first inner surface, the second inner surface, and the second outer surface with each sheet aligned and the areas without the plurality of insulating sheets aligned.

16. An aerogel window film system comprises,
a first pane;
a second pane;
a spacer;
a barrier sealant;
a center layer;
two transparent layers;
a spacer seal;
an insulating gas;
a plurality of insulating sheets, wherein the plurality of insulating sheets consist of a first sheet a second sheet a second sheet and a fourth sheet;
the center layer being an aerogel layer, and the aerogel layer comprising at least one hole; the at least one hole being filled with a transparent material, wherein said transparent material is not aerogel;
the plurality of insulating sheets comprises a insulating film, a film, and an adhesive;
the first pane having a first inner surface and a first outer surface;
the second pane having a second inner surface and a second outer surface;
the spacer comprises at least one gas hole and at least one hole sealer;
one of the two transparent layers being attached to the first outer surface with a transparent adhesive, and the other one of the two transparent layers being attached to the second outer surface with the transparent adhesive;
the spacer being peripherally adhered to the first inner surface of the first pane by the spacer seal;
the second pane being aligned and adhered to spacer opposite of the first pane;
the spacer being peripherally adhered to the second inner surface of the second pane by the spacer seal; and
the at least one gas hole being traversed through the spacer.

17. The aerogel window film system as claimed in claim 16 comprises,
    the spacer, the first pane, and the second pane defining a sealed space;
    the at least one gas hole being traversed through the spacer into the sealed space;
    the at least one gas hole being sealed by the at least one hole sealer;
    the barrier sealant being peripherally adhered to the first inner surface, the second inner surface and the spacer; and
    the sealed space being filled with the insulating gas.

18. The aerogel window film system as claimed in claim 16 comprises,
    each insulating sheet being shaped to any shape, wherein each insulating film can be uniquely shaped into trademarks, symbols, lettering, decorative shapes, logos, or have holes all positioned inline on the first pane and second pane;
    the insulating film comprises of a plurality of holes;
    the film having a first film, a second film, and a plurality of hole fillers;
    the first film being aligned and adhered to the insulating film by the adhesive;
    the plurality of hole fillers being inserted into the plurality of holes;
    the second film being aligned and adhered to the insulating film by the adhesive
    the film and the insulating film being combined, wherein the combination is flush and level; and
    the adhesive being applied to the second film opposite of the film.

19. The aerogel window film system as claimed in claim 18 comprises,
    the first sheet being adhered to the first outer surface by the adhesive;
    the second sheet being adhered to the first inner surface by the adhesive within the sealed space;
    the third sheet being adhered to the second inner surface by the adhesive within the sealed space; and
    the fourth sheet being adhered to the second outer surface by the adhesive.

20. The aerogel window film system as claimed in claim 16 comprises,
    the at least one film being a film selected from the group consisting of graphic screen-printing films, safety security films, decorative films, weather resistant films, flame retardant films, conformal film, temperature resistant films, chemical resistant films, radiant heat reflective films, UV stabilized films, colored films, coated films, light diffusing films, optically clear films, translucent films, water resistant films, abrasion resistant films, or glare reduction films;
    the insulating film being made from a material selected from the group consisting of X-aerogel, wherein the X-aerogel film is able to provide heat and sound insulation; and
    the adhesive being a transparent adhesive selected from the group consisting of light curing adhesive, heat activated adhesive, structural adhesive, pressure sensitive adhesive, peel and stick adhesive, or a water activated adhesive.

21. The aerogel window film system as claimed in claim 16 comprises,
    wherein the plurality of insulating sheets are matching and inline with consistent designs on the first outer surface, the first inner surface, the second inner surface, and the second outer surface.

22. The aerogel window film system as claimed in claim 16 comprises,
    wherein the plurality of insulating sheets are consistently shaped and consistently aligned on the first outer surface, the first inner surface, the second inner surface, and the second outer surface with each sheet aligned and the areas without the plurality of insulating sheets aligned.

23. An aerogel window film system comprises,
    a first pane;
    a second pane;
    a spacer;
    a barrier sealant;
    a center layer;
    two transparent layers;
    a spacer seal;
    an insulating gas;
    a plurality of insulating sheets, wherein the plurality of insulating sheets consist of a first sheet a second sheet a second sheet and a fourth sheet;
    the center layer being an aerogel layer, and the aerogel layer comprising at least one hole; the at least one hole being filled with a transparent material, wherein said transparent material is not aerogel;
    the plurality of insulating sheets comprises at least one insulating film, at least one film, and an adhesive;
    the first pane having a first inner surface and a first outer surface;
    the second pane having a second inner surface and a second outer surface;
    the spacer comprises at least one gas hole and at least one hole sealer;
    one of the two transparent layers being attached to the first outer surface with a transparent adhesive, and the other one of the two transparent layers being attached to the second outer surface with the transparent adhesive;
    the spacer being peripherally adhered to the first inner surface of the first pane by the spacer seal;
    the second pane being aligned and adhered to spacer opposite of the first pane;
    the spacer being peripherally adhered to the second inner surface of the second pane by the spacer seal;
    the spacer, the first pane, and the second pane defining a sealed space;
    the at least one gas hole being traversed through the spacer into the sealed space;
    the at least one gas hole being sealed by the at least one hole sealer;
    the barrier sealant being peripherally adhered to the first inner surface, the second inner surface and the spacer;
    the sealed space being filled with the insulating gas;
    the at least one film being a film selected from the group consisting of graphic screen-printing films, safety security films, decorative films, weather resistant films, flame retardant films, conformal film, temperature resistant films, chemical resistant films, radiant heat reflective films, UV stabilized films, colored films, coated films, light diffusing films, optically clear films, translucent films, water resistant films, abrasion resistant films, or glare reduction films;

the insulating film being made from a material selected from the group consisting of X-aerogel, wherein the X-aerogel film is able to provide heat and sound insulation;

the adhesive being a transparent adhesive selected from the group consisting of light curing adhesive, heat activated adhesive, structural adhesive, pressure sensitive adhesive, peel and stick adhesive, or a water activated adhesive; and the plurality of insulating sheets are consistently shaped and consistently aligned on the first outer surface, the first inner surface, the second inner surface, and the second outer surface with each sheet aligned and the areas without the plurality of insulating sheets aligned.

* * * * *